United States Patent Office 3,132,132
Patented May 5, 1964

3,132,132
CATIONIC THIAZOLE DYES AND PROCESS FOR MANUFACTURING THE SAME
Mitsuo Suzuki, Nakano-ku, Tokyo, Masao Iizuka, Kanagawa-ku, Yokohama, and Masao Yamamoto, Hodogaya-ku, Yokohama, Japan, assignors to Hodogaya Kagaku Kogyo Kabushiki Kaisha
No Drawing. Filed May 29, 1961, Ser. No. 113,110
Claims priority, application Japan June 2, 1960
4 Claims. (Cl. 260—158)

The present invention relates to a new series of useful basic monoazo-dyes of the general formula

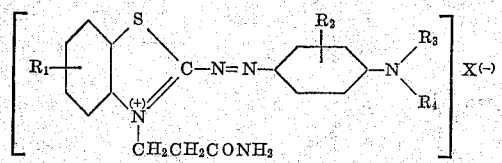

and a process for manufacturing the same. In the above formula $R_1$ stands for hydrogen atom or an unionizable radical as substituent, preferably an alkyl or alkoxy radical such as methyl, ethyl, methoxy, ethoxy and phenoxy radical, $R_2$ represents hydrogen atom or an aliphatic radical, $R_3$ as well as $R_4$ means hydrogen atom, an aliphatic or an araliphatic radical and X indicates an anion. The dyes according to the present invention exert very excellent dyeing properties on fibers made from polyacrylonitrile and copolymers thereof. The dyes obtained according to the present invention are characterized by its possessing a β-carbamoylethyl radical as a substituent at the tertiary amino nitrogen in thiazole ring of the above general formula.

It has already been known that a benzothiazole azo compound having a quaternary nitrogen atom can be prepared by the reaction of an alklating reagent selected from a variety of compounds on the thiazole nitrogen of an azo-dye having a thiazole ring, these compounds being exemplified by alkylchlorides, alkylbromides, alkyliodides, aralkylhalides, dialkylsulfates, alkylbenzenesulfates, alky-p-methylbenzenesulfates (cf., for instance, Glauert, J. Chem. Soc. (1953) 3742). It is also known that cationic dyes prepared by the just mentioned process are applicable to dyeing of fibers manufactured from polyacrylonitrile and copolymers thereof (cf., for instance, American Cyanamid Co. U.S. 2,893,816).

However, being distinguished in chemical structure from these known dyes as illustrated by the above general formula, the basic monoazo-dyes according to the present invention are entirely novel in respect of that they have not appeared ever in literature. In addition, as compared with salts of the known dyes, salts of the new dyes obtained according to the present invention proved to be of paramount use because of their exerting unexampled splendid dying properties on fibers made of polyacrylonitrile and copolymers thereof. Thus, in the case of mutual identity of $R_1$, $R_2$, $R_3$ and $R_4$ in the general formula, for instance, the strong auxochromic effect of carbamoylethyl group makes the dyes of the present invention as applied on polyacrylonitrile fibers deepen the color tone of the dye fibers to a remarkable extent, allowing a greenish blue dye to be realized with ease This is quite a new matter never experienced with any dyes ever reported in literature. In contrast with the known allied dyes defective in their rapidly retiring in solubility in water caused by some increased of molecular weight, the dyes of the present invention are suitable owing to their said large solubility to be used in printings of various objects. To speak of a further merit of the dyes according to the present invention, they are able to be applied at a moderate rate of dyeing without being weakened in their affinity for polyacrylonitrile and copolymers thereof as manufactured into various articles. The rate of dyeing with which said kinds of known cationic dyes are dyed on polyacrylonitrile fibers is so great that, as expected from reported pre-eminent large activation energy of dyeing as compared with other dispersion dyes and acidic ones, an even dyeing can hardly be attained for certain unless maintenance of a uniform temperature distribution throughout the dyeing bath and slow temperature elevation of the bath are carefully practiced. The excellence in the above connection of the dyes of the present invention not only excludes the problem of mere ring dyeing but contributes to improving rubbing fastness. They are not less better than the known dyes also in the aspect of light fastness as well as washing fastness.

Now, through investigations on the method of preparing the present new useful cationic dyes, a new process for manufacturing them was discovered which proved very satisfactory not only in its technical aspect but also in the economical point of view. This invented process comprises letting acrylamide react directly on a tertiary amine of benzothiazole type, either subjected to no further processing or dissolved in a proper solvent, in the presence of an organic or inorganic acid capable of working as a proton-donor so as to produce a quaternary basic monoazo-dye belonging in chemical structure to the aforementioned general formula. Because no reaction has ever been proposed which allows quaternary ammonium compounds to be produced by direct action of acrylamide on tertiary amino compounds especially of weak basicity, the manufacturing process according to the present invention is looked upon as a new sort of chemical reaction, the process being illustrated by the following chemical schema:

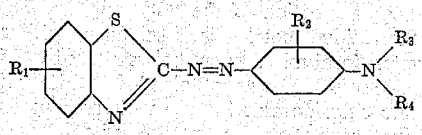 + $CH_2:CH \cdot CONH_2$ + $H^+$ ⟶ 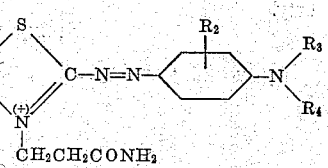

where $R_1$, $R_2$, $R_3$ and $R_4$ are in agreement in their meaning with the corresponding notations in the general formula given in the beginning of this specification.

Although the present reaction can proceed even in the absence of solvent, use of a solvent is preferable, especially such as effectively dissolves the tertiary amino compound employed as raw material. The preferable solvent is exemplified by alcohols such as ethanol, butanol, ethyleneglycol, ethers such as tetrahydrofuran, dioxan, dimethylformamide and methylamylketone, while suitable derivatives of hydrocarbones of benzene series such as nitrobenzene, chlorobenzene and etc. are also available.

As proton-donating acid, besides inorganic acids such as hydrochloric acid, sulfuric acid, phosphoric acid, hydrobromic acid and hydroiodic acid, organic acids such as glacial acetic acid, formic acid, benzenesulfonic acid and toluenesulfonic acid can also be advantageously employed.

Though the present reaction is in itself a sort of exothermic reaction, heating is necessary in starting the reaction, carrying out the reaction at a thus elevated temperature being preferable.

As one of the most familiar processes for manufacturing quaternary amino compounds, a method is known according to which an alkylhalide, a sulfuric acid ester or a sulfonic acid ester is made to react on a tertiary amino compound. Also the dyes according to the present invention can be obtained by making a halogenated propionic acid amide react on a tertiary amine compound of benzothiazole type. However, from the weakness of the known process of necessitating special preparation of the halogenated propionic acid amide which is possible to require very long time according to the kind of the halogen concerned, allowing the reaction product to be obtained only at a low yield and etc., the process can hardly be regarded as satisfactory as compared with the new manufacturing process according to the present invention.

In the following, the present invention may be explained by examples, the word "parts" in these examples meaning parts in weight.

*Example 1*

A compound

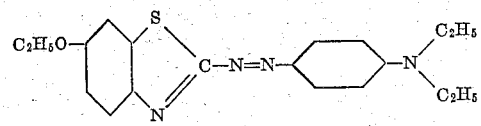

in an amount of 177 parts and acrylic acid amide of 355 parts are dissolved in 1770 parts of glacial acetic acid. The mixture is then added with 47 parts of 35% hydrochloric acid, heated under thorough stirring to 90° C. and kept at this temperature for 3 hours in reaction. After completion of the reaction, a great portion of the glacial acetic acid is recovered, the content of the reaction vessel being then dissolved in 5000 parts of water. The solution, after being freed from insoluble matters by filtration, if necessary, is added with 70 parts of zinc chloride and further with sodium chloride of an amount corresponding to 10% of total weight of the mixture so as to cause the salt of dye as reaction product to precipitate. Separating by filtration and drying the precipitate, a blue dye is obtained which dissolves readily in water and dyes polyacrylonitrile fibers brilliantly clear blue shade with an excellent fastness and level dyeing property.

*Example 2*

By working analogously to Example 1 but using 189 parts of

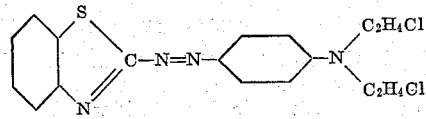

instead of 177 parts of

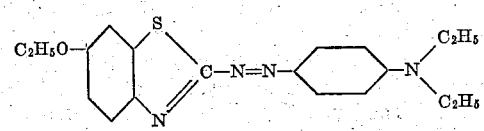

a dye is obtained which is excellent in fastness, level dyeing property and dyes polyacrylonitrile fibers brilliant blue shade.

*Example 3*

Working analogously to Example 1 but using 141 parts of

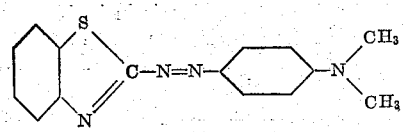

instead of

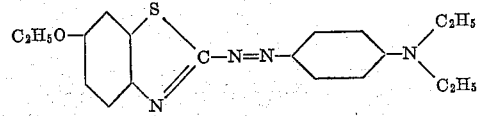

a dye is obtained which is excellent in fastness, having level dyeing property and dyes polyacrylonitrile fibers reddish blue shade.

*Example 4*

By a reaction similar to that in Example 1 except the use of 163 parts of

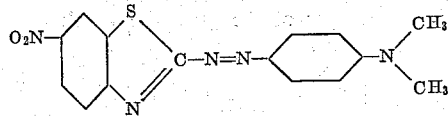

instead of

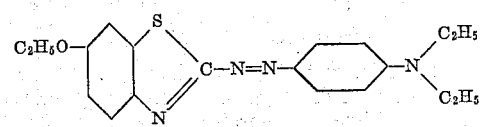

and a reaction time of 5 hours, a dye is obtained having an excellent fastness and level dyeing property, which dyes polyacrylonitrile fibers brilliant bluish violet shade.

*Example 5*

A compound

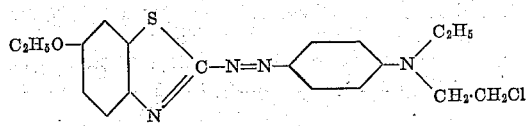

amounting to 195 parts is dissolved together with 71 parts of acrylic acid amide in 1000 parts of ethyleneglycol. The solution is then added with 500 parts of sodium chloride, heated under thorough stirring till it acquires a temperature of 100° C. and added with 250 parts of concentrated sulfuric acid drop by drop in a period of 2 hours. After the reaction was completed by keeping the temperature for further 2 hours at this temperature, a great portion of the ethyleneglycol is recovered and the residual portion is dissolved by adding 5000 parts of water, insoluble matters being filtered off, if necessary. The solution thus obtained is added with 70 parts of zinc chloride and further with sodium chloride in an amount corresponding to 10% of total weight of the solution so that the salt of dye produced may be precipitated. The dye obtained by drying the precipitate dissolves readily in water giving a blue-colored solution and dyes polyacrylonitrile fibers greenish blue shade; the color is brilliantly clear and excellent in fastness to light, rubbing and washing.

*Example 6*

In 1000 parts of 80% formic acid, 161 parts of a compound

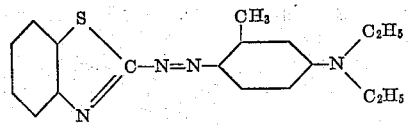

and 284 parts of acrylic acid amide is thoroughly dissolved. A reaction is made to proceed by stirring the solution for 2 hours at 100° C. After the completion of reaction, the mixture is poured in 20,000 parts of water, completely dissolved and added first with 70 parts of zinc chloride and then with sodium chloride amounting to 10% of total weight of the solution so that the salt of dye as reaction product may be precipitated. The dye obtained by separating by filtration and drying is readily soluble in water and dyes polyacrylonitrile fibers reddish blue shade, having leveling property and being very excellent in fastness.

*Example 7*

By working similarly to Example 6 but using 127 parts of

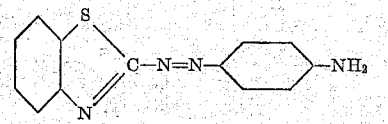

instead of 161 parts of

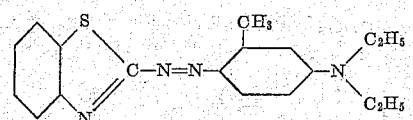

a dye is obtained which dyes polyacrylonitrile fibers brilliant violet, the color being excellent in fastness as well as in leveling.

*Example 8*

By a reaction similar to that in Example 6 but with 193 parts of

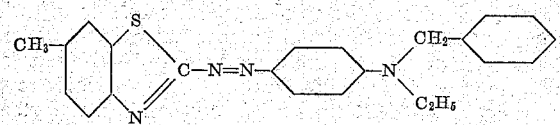

instead of

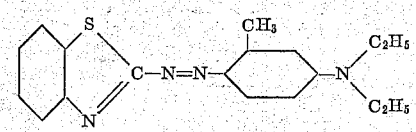

and 1500 parts of 80% formic acid, a dye is obtained which dyes polyacrylonitrile fibers brilliant greenish blue, the color being excellent in fastness as well as in property of level dyeing.

*Example 9*

Working similarly to Example 8 but using 187 parts of

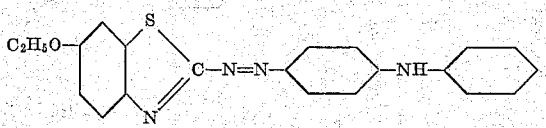

instead of

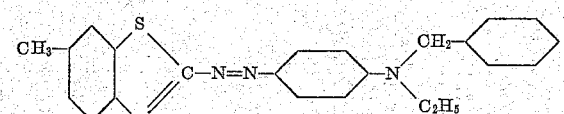

after a reaction extended for 4–5 hours, a dye is obtained which dyes polyacrylonitrile fibers greenish blue and has excellent fastness and property of level dyeing.

*Example 10*

In 1800 parts of glacial acetic acid, a compound

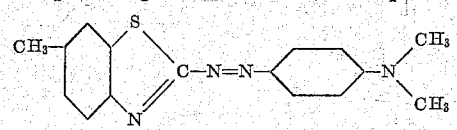

amounting to 141 parts is dissolved together with 284 parts of acrylic acid amide. The solution is added with 183 parts of p-toluenesulfonic acid (tetrahydrate), heated under thorough stirring to 90° C. and kept at this temperature for 2 hours till the reaction is completed. Then, a great portion of the glacial acetic acid is recovered under reduced pressure. The residual portion is then dissolved in 5000 parts of water, insoluble matters being removed, if necessary, by filtration. The solution is added first with 70 parts of zinc chloride and then with sodium chloride in an amount equal to 10% of total weight of the solution so as to cause salt of dye to precipitate. The dye thus obtained dissolves quite readily in water, giving rise to a reddish blue solution. It dyes polyacrylonitrile fibers a somewhat reddish blue shade which has property of level dyeing and is excellent in fastness.

*Example 11*

Subjecting 162 parts of

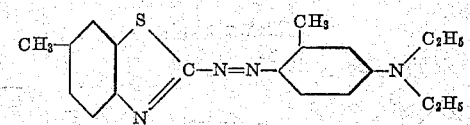

instead of

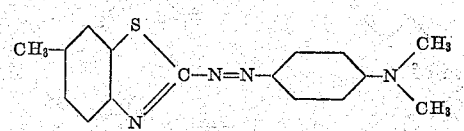

for 5–6 hours to a reaction analogous to that in Example 10, a dye is obtained which dyes polyacrylonitrile fibers reddish blue and is excellent in fastness as well as in level dyeing property.

*Example 12*

Working similarly to Example 10 but with 189 parts of

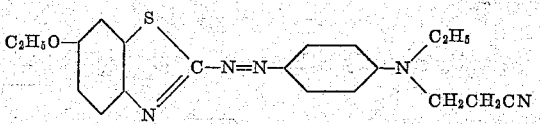

instead of

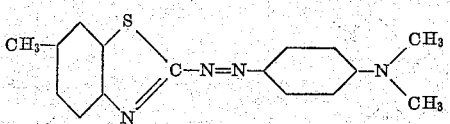

a dye is obtained which dyes polyacrylonitrile fibers greenish blue and is excellent in fastness and property of level dyeing.

*Example 13*

Working analogously to Example 11 but using 177 parts of

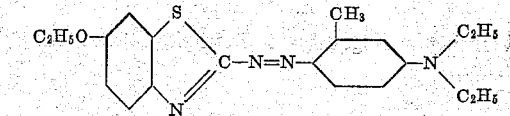

instead of

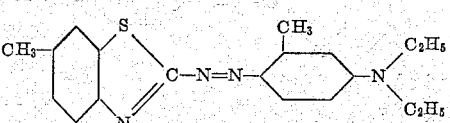

a dye is obtained which dyes polyacrylonitrile fibers rather pure blue as compared with the dye obtained in Example 11 and is excellent in fastness and in level dyeing property.

*Example 14*

In 1000 parts of ethylalcohol, 236 parts of a compound

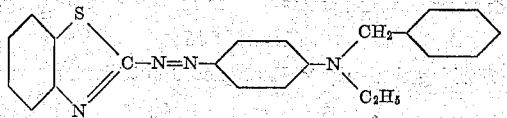

and 107 parts of acrylic acid amide are dissolved. The solution is added with 180 parts of 48% hydrobromic acid, heated under thorough stirring and subjected to reaction for about 4 hours at a temperature corresponding to the boiling point of ethylalcohol. Then, a great portion of the ethylalcohol is recovered under reduced pressure, the residual portion being dissolved in 7500 parts of water. The aqueous solution is added with 105 parts of zinc chloride and then with sodium chloride amounting to 8% of total weight of the solution so that the salt of dye produced may be caused to precipitate. The dye thus obtained readily dissolves in water, yielding a blue solution, and dyes polyacrylonitrile fibers greenish blue, the color being excellent in fastness as well as in level dyeing property.

*Example 15*

Employing 253 parts of

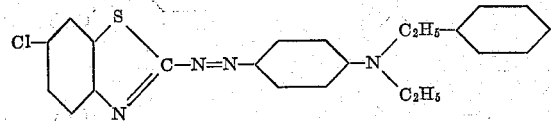

instead of

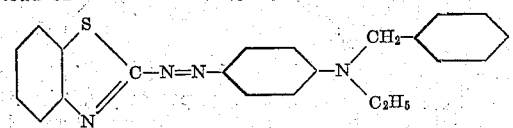

and working analogously to Example 14, a dye is obtained which dyes polyacrylonitrile fibers a brilliant blue shade and is excellent in fastness and also in property of level dyeing.

*Example 16*

Working similarly to Example 14 but with 258 parts of

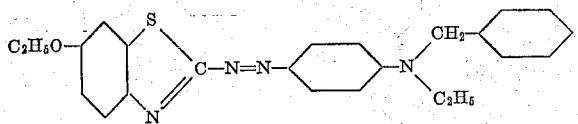

instead of

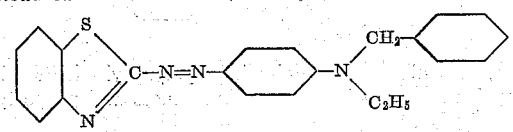

a dye is obtained which dyes polyacrylonitrile fibers a brilliant greenish blue shade and is excellent in fastness and property of level dyeing.

*Example 17*

Working analogously to Example 14 but using 212 parts of

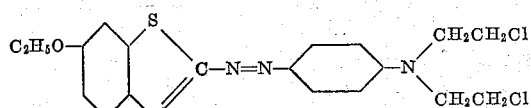

instead of

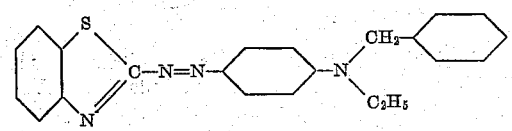

a dye is obtained after a reaction of 1 hour, which dyes polyacrylonitrile fibers a brilliant greenish blue shade and is excellent in fastness as well as in level dyeing property.

*Example 18*

Working similarly to Example 10 but that 170 parts of

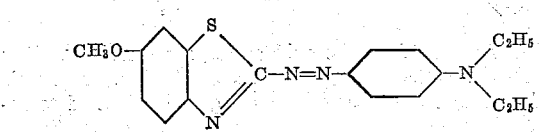

and 119 parts of benzenesulfonic acid are used instead of

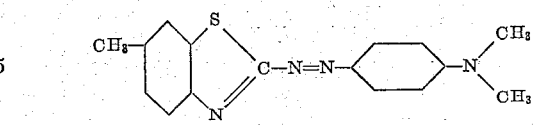

and p-toluenesulfonic acid, respectively, a dye is obtained by conducting the reaction for 4–5 hours, which dyes polyacrylonitrile fibers brilliant blue and is excellent in fastness and in level dyeing property.

*Example 19*

In 1000 parts of dioxan, 204 parts of a compound

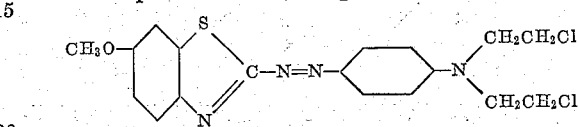

and 284 parts of acrylic acid amide are dissolved. The solution is added with 700 parts of 80% formic acid and under stirring brought to 100° C. The mixture is added further with 500 parts of formic acid drop by drop in a duration of 2 hours. After completion of the addition of formic acid drops, the whole system is further agitated for about an hour to bring the reaction completed. Then, the whole reaction mixture is poured into 10,000 parts of water, removed of insoluble matters by filtration, if necessary, added with 70 parts of zinc chloride and further with sodium chloride amounting to 10% of total weight of the solution so that the salt of dye as reaction product may be precipitated out of the solution. The dye obtained by filtrating and drying readily dissolves in water, producing a blue solution. It has leveling property and dyes polyacrylonitrile fibers a brilliant greenish blue shade which is fast to light, washing and rubbing.

*Example 20*

Working similarly to Example 19 but using 178 parts of

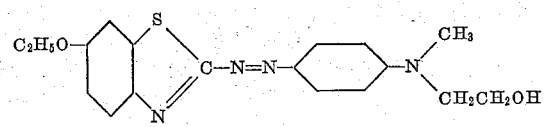

instead of

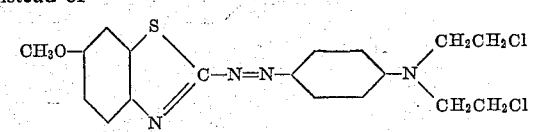

a dye is obtained which dyes polyacrylonitrile fibers blue and is excellent in fastness as well as in level dyeing property.

*Example 21*

Working analogously to Example 19 but using 148 parts of

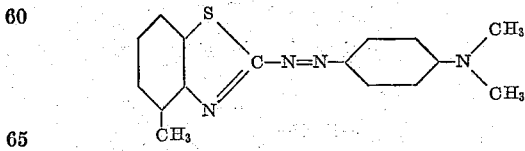

instead of

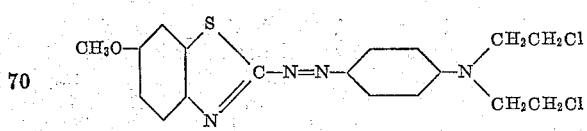

a dye is obtained which dyes polyacrylonitrile fibers a somewhat reddish blue shade and has excellent fastness and property of level dyeing.

Example 22

In 2000 parts of nitrobenzene, 151 parts of a compound

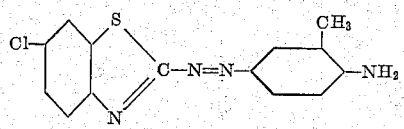

and 180 parts of acrylic acid amide are dissolved. The solution is added with 55 parts of concentrated sulfuric acid, heated under stirring to 100° C. and subjected to reaction for about 3 hours at this temperature. Then, a great portion of the nitrobenzene is recovered. The residual portion is then dissolved in 5000 parts of water, removed of insoluble matters by filtration, if necessary, added first with 70 parts of zinc chloride and then with sodium chloride amounting to 10% of total weight of the solution so that the salt of dye as product may be precipitated out of the solution. The dye thus obtained has a very large solubility in water and shows bluish violet color. It dyes polyacrylonitrile fibers a bluish violet shade which is excellent in fastness and also in level dyeing.

We claim:

1. Basic monoazo-dyes represented by a general formula

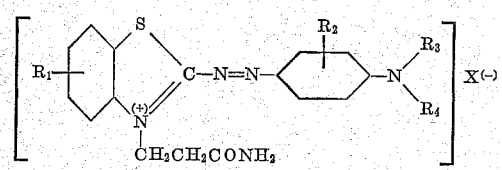

wherein $R_1$ is a member selected from the group consisting of hydrogen, lower alkyl and lower alkoxy, $R_2$ is a member selected from the group consisting of hydrogen and lower alkyl, $R_3$ and $R_4$ each mean a member selected from the group consisting of hydrogen, lower alkyl, ethylchloride, ethylcyanide, benzyl, and ethylbenzyl, and X indicates an anion.

2. A basic monoazo-dye represented by a structural formula

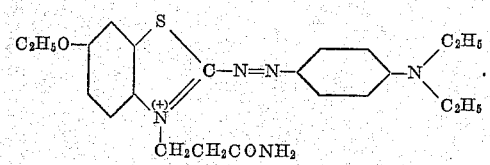

3. A process for manufacturing basic monoazo-dyes consisting of that a compound represented by a general formula

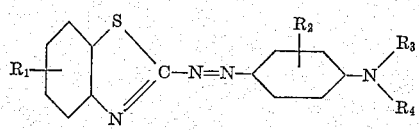

wherein $R_1$ is a member selected from the group consisting of hydrogen, lower alkyl and lower alkoxy, $R_2$ is a member selected from the group consisting of hydrogen and lower alkyl, $R_3$ and $R_4$ each mean a member selected from the group consisting of hydrogen, lower alkyl, ethylchloride, ethylcyanide, benzyl, and ethylbenzyl, is subjected to reaction directly with acrylic acid amide, the reaction being carried out at an elevated temperature in a suitable solvent and in the presence of an acid as a proton donor.

4. A process for manufacturing a basic monoazo dye consisting of reacting a compound having the following formula:

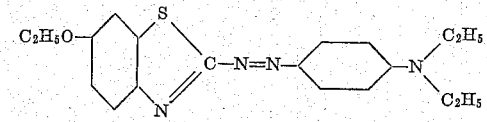

with acrylic acid amide at an elevated temperature in a suitable solvent and in the presence of an acid proton donor.

References Cited in the file of this patent

UNITED STATES PATENTS

| | | |
|---|---|---|
| 2,864,812 | Bossard et al. | Dec. 16, 1958 |
| 2,893,816 | Tsang et al. | July 7, 1959 |

OTHER REFERENCES

Hickenbottom, "Reactions of Organic Comps.," 1948, 2nd ed., pages 24 and 25, Longmans, Green and Co.